(12) United States Patent
Ohata

(10) Patent No.: US 10,704,675 B2
(45) Date of Patent: Jul. 7, 2020

(54) VEHICLE AND CONTROL METHOD THEREOF

(71) Applicant: YAMAHA HATSUDOKI KABUSHIKI KAISHA, Iwata-shi, Shizuoka (JP)

(72) Inventor: Shinobu Ohata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 505 days.

(21) Appl. No.: 15/654,751

(22) Filed: Jul. 20, 2017

(65) Prior Publication Data

US 2018/0023688 A1 Jan. 25, 2018

(30) Foreign Application Priority Data

Jul. 21, 2016 (JP) .................. 2016-142970

(51) Int. Cl.
*F16H 59/42* (2006.01)
*B60W 30/186* (2012.01)
(Continued)

(52) U.S. Cl.
CPC ............. *F16H 59/42* (2013.01); *B60W 10/02* (2013.01); *B60W 30/186* (2013.01);
(Continued)

(58) Field of Classification Search
CPC . F16D 2500/10406; F16D 2500/10412; F16D 2500/30404; F16D 2500/5106; F16D 2500/30415; F16D 2500/30426; F16D 2500/50287; F16D 2500/5048; F16D 2500/7027; F16D 2500/70426; F16D 2500/70454; F16D 48/00; F16H 2059/6807; F16H 2061/161; F16H 59/40; F16H 59/42; F16H 61/702; F16H 63/44; F16H 63/502; B60W 10/02; B60W 10/06; B60W 2300/362; B60W 2510/0225; B60W 2510/0241; B60W 2510/0275; B60W 2510/0604; B60W 2510/0638; B60W 2510/1005; B60W 2510/104;
(Continued)

(56) References Cited

U.S. PATENT DOCUMENTS 4,497,222 A * 2/1985 Nagaoka ............... F16D 48/062
477/124
4,646,891 A * 3/1987 Braun ............... B60W 30/1819
192/111.12
(Continued)

FOREIGN PATENT DOCUMENTS

| EP | 3 012 478 A1 | 4/2016 |
|---|---|---|
| JP | 5-178111 A | 7/1993 |
| WO | 2008/015059 A1 | 2/2008 |

*Primary Examiner* — Jacob S. Scott
(74) *Attorney, Agent, or Firm* — Keating and Bennett, LLP

(57) ABSTRACT

A controller causes a clutch to transition from a half-engaged state to an engaged state when a difference in rotational velocity between input and output sides of the clutch falls within a predetermined range in the half-engaged state of the clutch. The controller executes a moving start control to increase an output rotational velocity of a prime mover and cause the clutch to transition to the engaged state when a predetermined first condition is satisfied in the half-engaged state of the clutch.

18 Claims, 13 Drawing Sheets

(51) Int. Cl.
*B60W 30/18* (2012.01)
*B60W 10/02* (2006.01)
*F16D 48/00* (2006.01)
*F16H 59/40* (2006.01)
*B60W 30/19* (2012.01)
*F16H 61/16* (2006.01)
*F16H 63/50* (2006.01)
*F16H 61/70* (2006.01)
*F16H 59/68* (2006.01)

(52) U.S. Cl.
CPC ....... *B60W 30/18027* (2013.01); *F16D 48/00* (2013.01); *F16H 59/40* (2013.01); *F16H 63/502* (2013.01); *B60G 2300/13* (2013.01); *B60W 30/19* (2013.01); *B60W 2300/362* (2013.01); *B60W 2510/0225* (2013.01); *B60W 2510/0241* (2013.01); *B60W 2510/0275* (2013.01); *B60W 2510/0604* (2013.01); *B60W 2510/0638* (2013.01); *B60W 2510/104* (2013.01); *B60W 2540/10* (2013.01); *B60W 2540/215* (2020.02); *B60W 2710/021* (2013.01); *B60W 2710/022* (2013.01); *B60W 2710/023* (2013.01); *B60W 2710/0644* (2013.01); *F16D 2500/5106* (2013.01); *F16H 61/702* (2013.01); *F16H 2059/6807* (2013.01); *F16H 2061/161* (2013.01)

(58) Field of Classification Search
CPC ......... B60W 2540/04; B60W 2540/10; B60W 2710/021; B60W 2710/022; B60W 2710/023; B60W 2710/0644; B60W 2710/1005; B60W 30/18027; B60W 30/186; B60W 30/19
See application file for complete search history.

(56) References Cited

U.S. PATENT DOCUMENTS

| | | | | |
|---|---|---|---|---|
| 5,337,874 | A | * | 8/1994 | Oltean ................. B60W 10/02 192/111.12 |
| 5,403,249 | A | * | 4/1995 | Slicker .................. F16D 48/06 477/176 |
| 5,630,773 | A | * | 5/1997 | Slicker .................. B60P 7/0807 477/176 |
| 5,679,099 | A | * | 10/1997 | Kato ..................... F16D 48/066 477/176 |
| 2002/0123410 | A1 | * | 9/2002 | Steeby ................... F16D 48/06 477/175 |
| 2006/0116239 | A1 | * | 6/2006 | Kumazawa ..... B60W 30/18027 477/115 |
| 2009/0312928 | A1 | | 12/2009 | Kramer et al. |
| 2014/0018209 | A1 | * | 1/2014 | Dodo ..................... F16D 48/08 477/176 |
| 2014/0141935 | A1 | | 5/2014 | Huff |
| 2017/0204968 | A1 | * | 7/2017 | Honma .................. F16H 59/14 |

* cited by examiner

VEHICLE AND CONTROL METHOD THEREOF

CROSS REFERENCE TO RELATED APPLICATIONS

This application claims the benefit of priority to Japanese Patent Application No. 2016-142970 filed on Jul. 21, 2016. The entire contents of this application are hereby incorporated herein by reference.

BACKGROUND OF THE INVENTION

1. Field of the Invention

The present invention relates to a vehicle and a control method thereof.

2. Description of the Related Art

Vehicles such as a recreational off-highway vehicle (ROV) have chances of traveling on unpaved roads of sandy terrain, rough terrain and so forth. In such a situation, wheels could get stuck (fixed without rotating).

On the other hand, there has been known a type of vehicle that automatically switches between clutch engagement and clutch disengagement with use of an electric actuator or so forth. In such a type of vehicle, a controller makes the clutch transition to a half-engaged state in accordance with throttle opening degree and engine rotational speed. When the input-side rotational velocity and the output-side rotational velocity in the clutch becomes approximately equal to each other without a difference, the controller automatically causes the clutch transition to an engaged state.

In this type of vehicle having the clutch control function, when the stuck state occurs as described above, the output-side rotational velocity in the clutch does not increase at all. Hence, the half-engaged state inevitably continues for a long period of time. This results in a drawback that the clutch degrades in durability. To solve this drawback, Japan Laid-open Patent Application Publication No. H05-178111, for instance, describes that the amount of heat released from a clutch in the half-engaged state is measured, and a controller forcibly makes the clutch transition to an engaged state when the amount of heat released becomes a predetermined value or greater.

However, when an output torque of an engine is insufficient compared to a drive torque for getting out of a stuck state, a vehicle cannot get out of the stuck state even if the clutch is forcibly engaged while the wheels are stuck. Therefore, there is a drawback that even if the clutch is engaged, the wheels do not rotate and engine stall is inevitable.

SUMMARY OF THE INVENTION

Preferred embodiments of the present invention enhance clutch durability and vehicle performance for getting out of a stuck state.

A vehicle according to a preferred embodiment of the present invention includes a prime mover, a pair of right and left wheels, a clutch, and a controller. The clutch is disposed in a driving force transmission path between the prime mover and the pair of right and left wheels. The controller is configured or programmed to cause the clutch to transition from a half-engaged state to an engaged state when a difference in rotational velocity between input and output sides of the clutch falls within a predetermined range in the half-engaged state of the clutch. The controller is further configured or programmed to execute a moving start control to increase an output rotational velocity of the prime mover and to cause the clutch to transition to the engaged state when a predetermined first condition is satisfied in the half-engaged state of the clutch.

A control method according to another preferred embodiment of the present invention relates to a method of controlling a clutch for a vehicle and includes the following steps. In the first step, the clutch is caused to transition from a half-engaged state to an engaged state when a difference in rotational velocity between input and output sides of the clutch falls within a predetermined range in the half-engaged state of the clutch. In the second step, a moving start control is executed to increase an output rotational velocity of the prime mover and cause the clutch to transition to the engaged state when a predetermined first condition is satisfied in the half-engaged state of the clutch.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
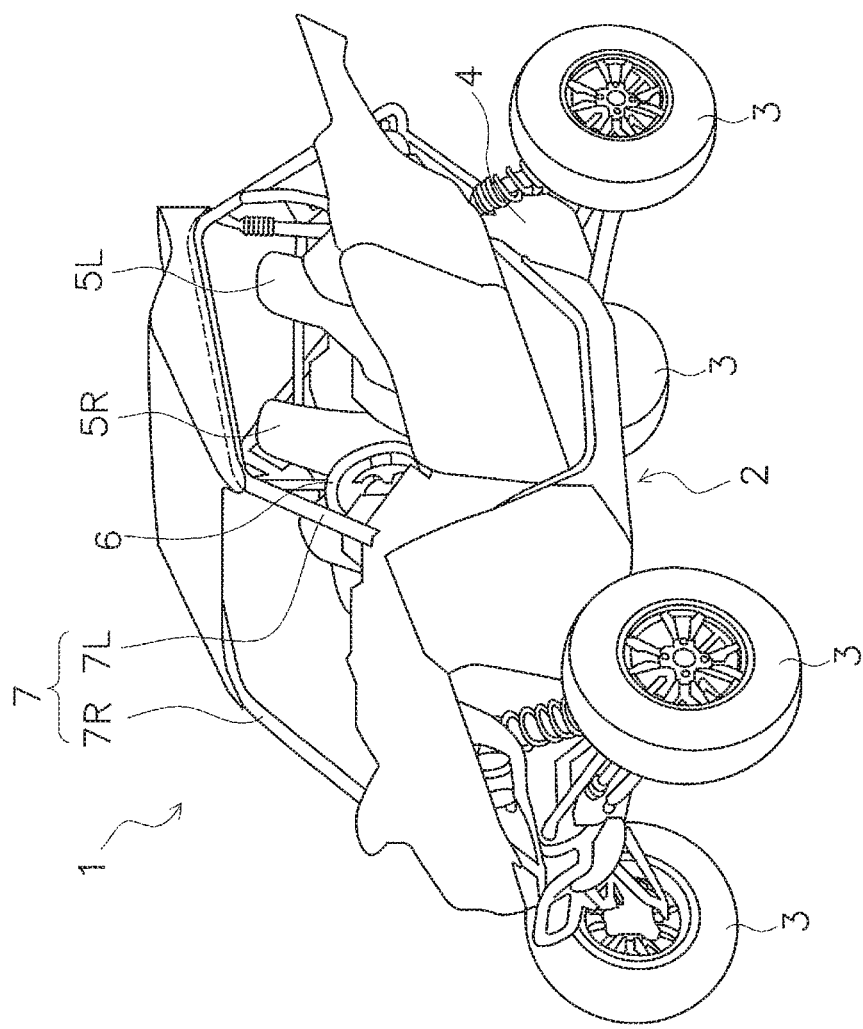
FIG. 1 is a perspective view of a vehicle according to a preferred embodiment of the present invention.

Vehicles according to preferred embodiments of the present invention will be hereinafter explained in detail with reference to the attached drawings. FIG. 1 is a perspective view of a vehicle 1 according to the present preferred embodiment. The vehicle 1 according to the present preferred embodiment preferably is, for example, a so-called ROV that is suitable for traveling on rough terrain.

As shown in FIG. 1, the vehicle 1 includes a vehicle body 2 and a plurality of wheels 3. The vehicle 1 preferably includes four wheels. Specifically, the vehicle 1 preferably includes two front wheels and two rear wheels. It should be noted that the number of wheels is not limited to four and may be greater than four. The vehicle body 2 includes a prime mover 4 and seats 5L and 5R. The prime mover 4 is disposed rearward of the seats 5R and 5L.

The seats 5R and 5L are preferably seats disposed in a side-by-side arrangement, and include a right seat 5R and a left seat 5L. A steering wheel 6 is disposed forward of the left seat 5L. A roll cage 7 is disposed above the seats 5R and 5L. The roll cage 7 includes right and left roll cages 7R and 7L. The left roll cage 7L extends from a position forward of the left seat 5L to a position rearward of the left seat 5L through a position above the left seat 5L. The right roll cage 7R extends from a position forward of the right seat 5R to a position rearward of the right seat 5R through a position above the right seat 5R.

It should be noted that the steering wheel 6 may be disposed forward of the right seat 5R. The roll cage 7 may extend in a right-and-left direction of the vehicle body 2.

Figure 2:
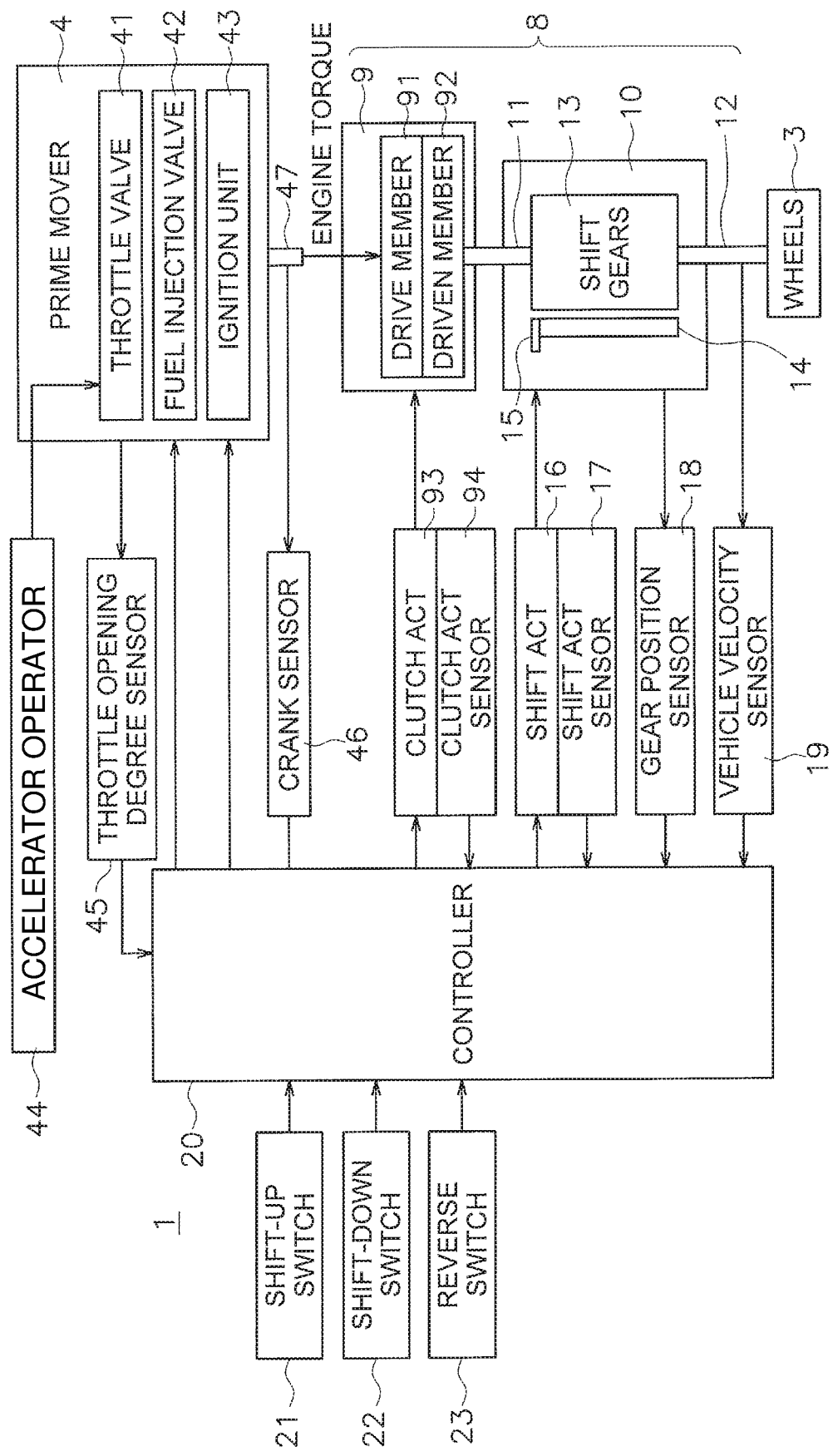
FIG. 2 is a block diagram showing a drive train and a control system of the vehicle.

FIG. 2 is a block diagram showing a drive train and a control system of the vehicle 1. As shown in FIG. 2, the vehicle 1 includes the prime mover 4 and a power train 8. In the present preferred embodiment, the prime mover 4 is an engine (for example, an internal combustion engine).

The prime mover 4 includes a throttle valve 41, a fuel injection valve 42, and an ignition unit 43. An accelerator operator 44 is coupled to the throttle valve 41. The accelerator operator 44 is operated by a driver. The accelerator operator 44 may be an accelerator pedal, for example. The opening degree of the throttle valve 41 (hereinafter referred to as "throttle opening degree") is changed in response to operating the accelerator operator 44. Therefore, the throttle opening degree is changed in accordance with the operating amount of the accelerator operator 44 (hereinafter referred to as "accelerator operating amount").

The fuel injection valve 42 injects fuel into the prime mover 4, and the amount of fuel to be injected is set in accordance with the accelerator operating amount or so forth. The ignition unit 43 causes spark discharge inside the prime mover 4 at a predetermined ignition timing within an engine cycle, such that mixed gas of fuel and air is ignited.

The power train 8 transmits a driving force from the prime mover 4 to the wheels 3. The power train 8 includes a clutch 9 and a transmission 10. The clutch 9 and the transmission 10 are disposed in a driving force transmission path of the power train 8. The clutch 9 is preferably a friction clutch. The clutch 9 includes a drive member 91 and a driven member 92. The drive member 91 is connected to a crankshaft 47 of the prime mover 4. The driven member 92 is connected to the transmission 10.

The drive member 91 and the driven member 92 approach and separate from each other. The drive member 91 and the driven member 92 are, for instance, clutch plates. It should be noted that each of the drive member 91 and the driven member 92 may have a different shape from a plate shape.

A torque to be generated by the prime mover 4 is input into the drive member 91. More specifically, rotation of the crankshaft 47 of the prime mover 4 is transmitted to the drive member 91. A reduction gear may be provided between the crankshaft 47 and the drive member 91.

The transmission 10 includes a main shaft 11, a drive shaft 12, a plurality of shift gears 13, a shift cam 14, and a shifter 15. The plurality of shift gears 13 are able to be moved into a plurality of gear positions. The plurality of gear positions include at least one forward gear position and at least one reverse gear position. The driven member 92 is connected to the main shaft 11. Rotation of the main shaft 11 is transmitted to the driven shaft 12 after being converted in accordance with the gear ratio and rotational direction corresponding to the selected gear position. The drive shaft 12 is connected to the wheels 3. The shifter 15 is an operating member that operates the shift cam 14. The plurality of shift gears 13 are changed by displacement (e.g., rotation, angular displacement, etc.) of the shift cam 14, such that one of the gear positions is selected.

The vehicle 1 includes a clutch actuator 93, a shift actuator 16, and a controller 20. The controller 20 includes a computer such as a CPU and memories such as a RAM and a ROM. The controller 20 is configured or programmed to control the clutch actuator 93 and the shift actuator 16. The actuators 16 and 93 may be electric actuators. Alternatively, the actuators 16 and 93 may be hydraulic actuators.

The clutch actuator 93 causes the drive member 91 and the driven member 92 in the clutch 9 approach and separate from each other. The clutch actuator 93 strengthens or weakens a pressing force acting between the drive member 91 and the driven member 92, while the drive member 91 and the driven member 92 make contact with each other. Accordingly, the drive member 91 and the driven member 92 make frictional contact with each other, and a torque to be transmitted therebetween increases and reduces.

The clutch 9 is able to be set in a disengaged state, an engaged state, and a half-engaged state. In the disengaged state, the drive member 91 and the driven member 92 are separated from each other, such that a torque is not transmitted therebetween. In the engaged state, the drive member 91 and the driven member 92 are engaged with each other without sliding against each other, such that a torque is transmitted therebetween. The half-engaged state is an intermediate state between the engaged state and the disengaged state. In the half-engaged state, the drive member 91 and the driven member 92 make contact with each other while sliding against each other (sliding contact), such that a portion of the torque is transmitted therebetween. By controlling the clutch actuator 93, the state of the clutch 9 is changed among the disengaged state, the half-engaged state, and the engaged state, and the pressing force acting between the drive member 91 and the driven member 92 is changed in the half-engaged state.

A clutch actuator sensor 94 detects the position of an actuating element of the clutch actuator 93. The position of the actuating element of the clutch actuator 93 corresponds to distance between the drive member 91 and the driven member 92 in the clutch 9. When the drive member 91 and the driven member 92 make contact with each other, the distance corresponds to the pressing force acting between the drive member 91 and the driven member 92. The controller 20 drives the clutch actuator 93 based on an output signal from the clutch actuator sensor 94, such that the pressing force in the clutch 9 is controlled.

The shift actuator 16 actuates the shifter 15 to operate the shift cam 14, such that a shift action is executed to change one gear position to another. A shift actuator sensor 17 detects the position of an actuating element of the shift actuator 16. The position of the actuating element of the shift actuator 16 corresponds to the position of the shifter 15. The controller 20 is configured or programmed to control the shift actuator 16 based on an output signal from the shift actuator sensor 17.

The transmission 10 includes a gear position sensor 18 and a vehicle velocity sensor 19. The gear position sensor 18 detects the gear position. The vehicle velocity sensor 19 detects the vehicle velocity. Output signals from these sensors are input into the controller 20.

The gear position sensor 18 detects the gear position of the transmission 10. Specifically, the gear position sensor 18 is preferably a sensor that detects the position (e.g., rotational position) of the shift cam 14.

The vehicle velocity sensor 19 detects the rotational velocity of the wheels 3. For example, the vehicle velocity sensor 19 may be a sensor that detects the rotational velocity of the drive shaft 12. The rotational velocity of the drive shaft 12 is proportional to that of the wheels 3. Hence, the rotational velocity of the wheels 3 is able to be detected by detecting the rotational velocity of the drive shaft 12. Correspondence is established between the rotational velocity of the drive shaft 12 and the output-side rotational velocity of the clutch 9 based on the shift gear ratio in the transmission 10. Therefore, the vehicle velocity sensor 19 detects the output-side rotational velocity of the clutch 9.

The vehicle velocity sensor 19 is preferably a magnetic sensor, for instance, and detects the rotation of a magnet that rotates together with the drive shaft 12. The controller 20 is able to calculate the vehicle velocity from the rotational velocity of the drive shaft 12 detected by the vehicle velocity sensor 19. Alternatively, the vehicle velocity sensor 19 may be a type of sensor other than a magnetic sensor.

A throttle opening degree sensor 45, a crank sensor 46, a shift-up switch 21, a shift-down switch 22, a reverse switch 23 and so forth are connected to the controller 20.

The throttle opening degree sensor 45 detects the throttle opening degree of the prime mover 4. A signal indicating the throttle opening degree is input into the controller 20.

The crank sensor 46 detects rotation of the crankshaft 47 of the prime mover 4. The crank sensor 46 is preferably a magnetic sensor, for instance, and detects rotation of a magnet that rotates together with the crankshaft 47. The controller 20 is able to calculate an engine rotational speed from the rotational velocity of the crankshaft 47 detected by the crank sensor 46. The engine rotational speed corresponds to an input-side rotational velocity of the clutch 9. Therefore, the crank sensor 46 detects the input-side rotational velocity of the clutch 9.

The shift-up switch 21 is operated by the driver in order to change the gear position (gear stage) of the transmission 10 by one stage toward a high speed side. The shift-down switch 22 is a switch to be operated by the driver in order to change the gear position (gear stage) of the transmission 10 by one stage toward a low speed side. Output signals from these shift switches 21 and 22 are input into the controller 20. The controller 20 is configured or programmed to execute a gear shift action by driving the clutch actuator 93 and the shift actuator 16 in response to inputs from the shift switches 21 and 22, such that the gear position (gear stage) is changed among a plurality of forward gear positions.

The reverse switch 23 is operated by the driver in order to select one of the at least one reverse gear position of the transmission 10. When the reverse switch 23 is operated during standstill of the vehicle 1, the controller 20 changes the gear position of the transmission 10 into the reverse position by controlling the clutch actuator 93 and the shift actuator 16.

During a moving start of the vehicle 1, the driver selects one of the gear positions other than the neutral position by operating the shift switch 21, 22 or the reverse switch 24. Accordingly, the controller 20 changes one shift gear 13 to be engaged in the transmission 10 to another shift gear 13 corresponding to the selected gear position by driving the shift actuator 16. Moreover, the driver increases the accelerator operating amount by operating the accelerator operator 44. When the throttle opening degree increases in response to this operation, the engine rotational speed increases. With the increase in engine rotational speed, the controller 20 increases the pressing force in the clutch 9 by controlling the clutch actuator 93, such that the drive member 91 and the driven member 92 approach each other.

The controller 20 is configured or programmed to set a target engine rotational speed in accordance with the throttle opening degree, and to control the pressing force in the clutch 9 such that the engine rotational speed increases toward the target engine rotational speed. Accordingly, the pressing force between the drive member 91 and the driven member 92 gradually increases, and the clutch 9 transitions from the disengaged state to the engaged state via the half-engaged state.

In this way, a torque generated by the prime mover 4 is transmitted to the transmission 10 through the clutch 9. Moreover, a change in the rotation speed in the transmission 10 is transmitted to the wheels 3, such that the vehicle 1 is moved. After the clutch 9 transitions to the engaged state, the controller 20 executes control of the fuel injection valve 42 (fuel injection control) and control of the ignition unit 43 (ignition control) so as to obtain an engine output in accordance with the throttle opening degree.

When the driver operates the shift-up switch 21 or the shift-down switch 22 during traveling, a gear shift command is input into the controller 20. In response to this, the controller 20 executes the gear shift action. Specifically, the controller 20 is configured or programmed to disengage the clutch 9 by controlling the clutch actuator 93. Moreover, the controller 20 causes a change to the shift gear 13 to be engaged among the plurality of shift gears 13 from the currently engaged shift gear 13 in accordance with the gear position selected in response to the gear shift command by controlling the shift actuator 16. Thereafter, the controller 20 changes the clutch 9 to the engaged state via the half-engaged state by controlling the clutch actuator 93. When the clutch 9 becomes the engaged state and the gear shift action is completed, the controller 20 executes the fuel injection control and the ignition control so as to obtain the engine output in accordance with the throttle opening degree.

When the vehicle velocity becomes lower than a shift-down threshold in the engaged state of the clutch 9, the controller 20 is configured or programmed to execute automatic shift-down control. Here, the shift-down threshold has been preliminarily set and the value thereof depends on the gear positions. More specifically, when the vehicle velocity becomes lower than a disengaging threshold of the clutch 9, the controller 20 changes the clutch 9 into the disengaged state by controlling the clutch actuator 93. Here, the value of the disengaging threshold depends on the gear stages. Subsequently, when the vehicle velocity becomes lower than the shift-down threshold, the controller 20 changes the gear position by controlling the gear shift actuator 16 so as to shift down the gear stage by one stage. When the vehicle velocity further becomes lower than the shift-down threshold such that the value thereof corresponds to the gear stage obtained after shifting down, the controller 20 changes the gear position so as to further shift down the gear stage by one stage. Thereafter, the controller 20 changes the clutch 9 to the engaged state via the half-engaged state by controlling the clutch actuator 93. When the clutch 9 becomes the engaged state and the gear shift action is completed, the controller 20 executes the fuel injection control and the ignition control so as to obtain the engine output in accordance with the throttle opening degree.

When the gear stage becomes the lowest stage and the vehicle velocity becomes lower than the disengaging threshold of the clutch 9 corresponding to the lowest stage, the controller 20 disengages the clutch 9. More specifically, when the vehicle velocity becomes lower than the disengaging threshold of the clutch 9 while the lowest one of the plurality of forward gear positions is selected, the clutch 9 is disengaged. This configuration is similarly true for the at least one reverse gear position. In a configuration that the number of reverse gear positions is only one, the clutch 9 is disengaged when the vehicle velocity becomes lower than the disengaging threshold of the clutch 9 corresponding to the reverse gear position.

Figure 3:
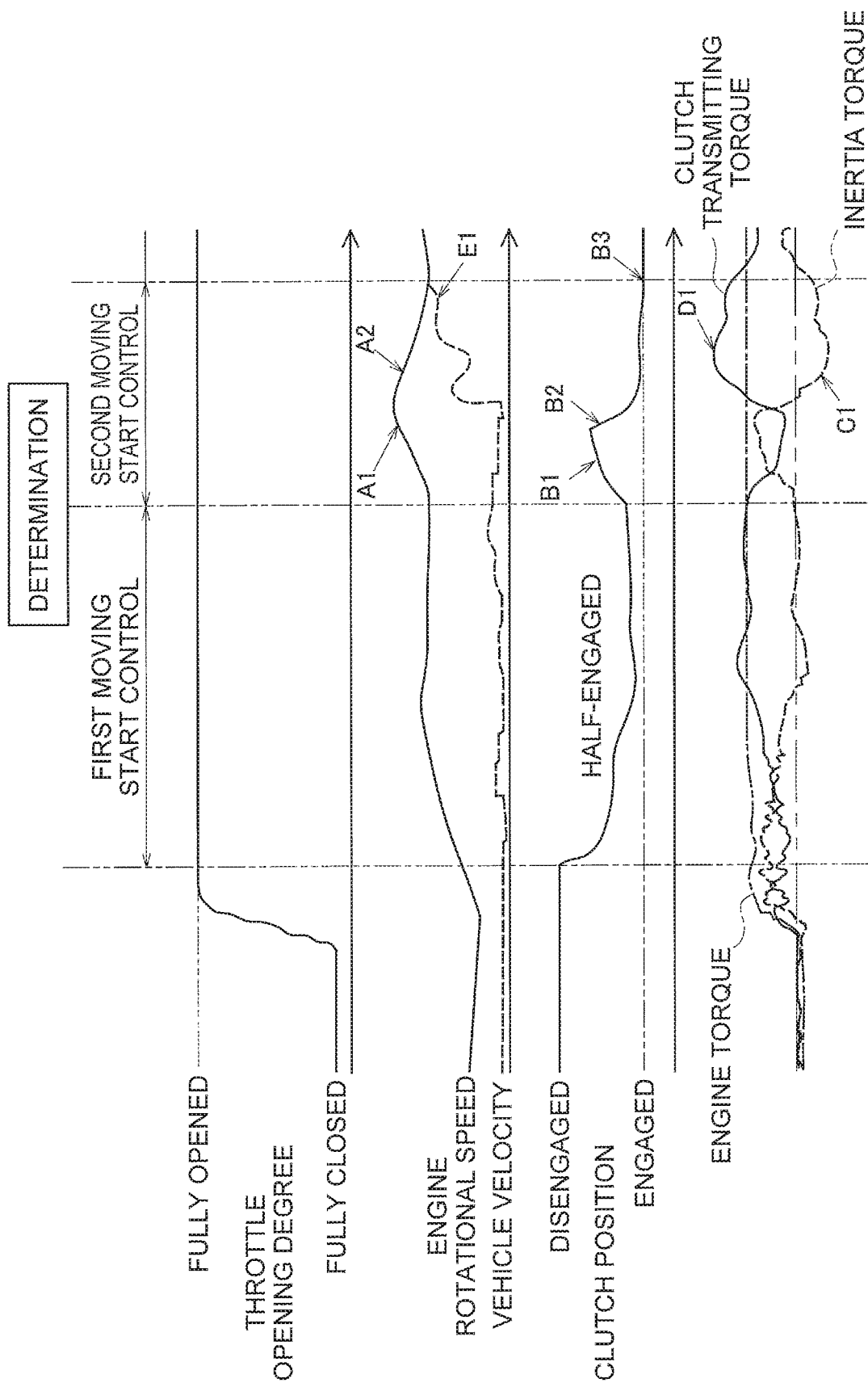
FIG. 3 is a timing chart showing variations in engine rotational speed and so forth during moving start control.

Additionally, the controller 20 is configured or programmed to execute a moving start control based on the throttle opening degree and the engine rotational speed. FIG. 3 is a timing chart showing variations in throttle opening degree, engine rotational speed, vehicle velocity, clutch position, engine torque, inertia torque, and clutch transmitting torque during the moving start control.

The moving start control includes a first moving start control and a second moving start control. The controller 20 executes the first moving start control when the throttle opening degree is greater than or equal to a predetermined throttle moving start threshold and the engine rotational speed is greater than or equal to a predetermined engine moving start threshold.

Figure 6:
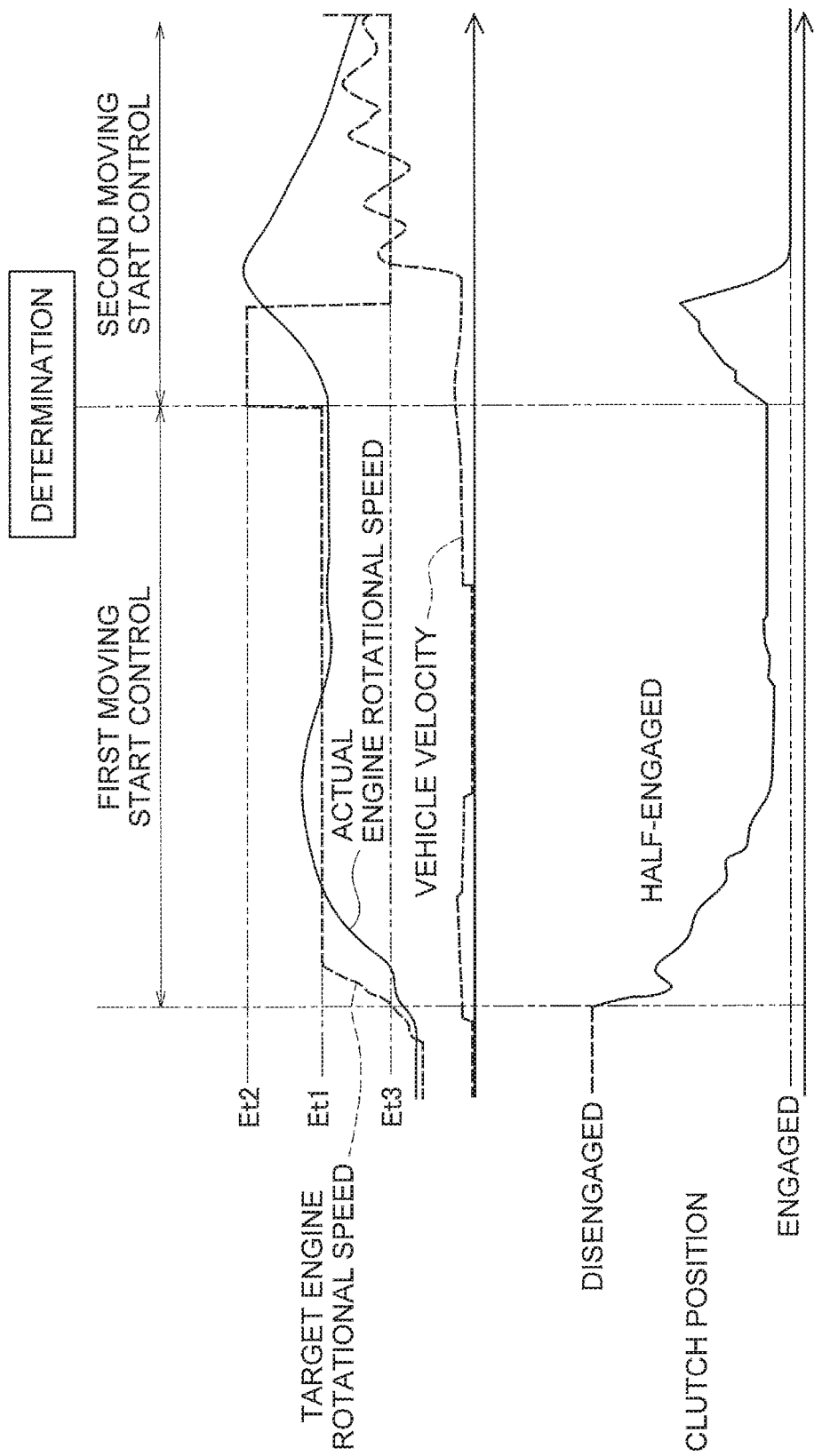
FIG. 6 is a timing chart showing variations in target engine rotational speed and variations in actual engine rotational speed during the moving start control.

As shown in FIG. 3, during the first moving start control, the controller 20 sets the clutch 9 to the half-engaged state. Then, as shown in FIG. 6, the controller 20 controls the pressing force in the clutch 9 such that the engine rotational speed converges to a target engine rotational speed Et1 set in accordance with the throttle opening degree. The controller 20 causes the clutch 9 to transition from the half-engaged state to the engaged state when a difference in rotational velocity between the input and output sides of the clutch 9 falls within a predetermined range during the first moving start control. The predetermined range is preferably set as a range of values that prevent excessive shock from occurring when the clutch 9 is engaged.

However, in a stuck state of the vehicle 1, chances are that the wheels 3 are kept standstill without rotating even if the first moving start control is executed. In this case, the output-side rotational velocity of the clutch 9 hardly increases. Additionally, during the first moving start control, when the accelerator operating amount is constant (e.g., constant in a fully operated state), the throttle opening degree is also constant. Therefore, the engine torque is also constant without increasing. Consequently, the vehicle 1 cannot get out of the stuck state, and the half-engaged state is inevitably maintained.

In view of this, in the vehicle 1 according to the present preferred embodiment, the controller 20 is configured or programmed to execute the second moving start control when a predetermined first condition is satisfied during the first moving start control. In the second moving start control, as shown in FIG. 3, the controller 20 increases the engine rotational speed (A1 in FIG. 3). In the present preferred embodiment, the controller 20 increases the engine rotational speed by causing the clutch 9 to transition toward the disengaged state (B1 in FIG. 3). Then, the controller 20 causes the clutch 9 to transition toward the engaged state while the engine rotational speed is increased (B2 in FIG. 3). Accordingly, the engine rotational speed decreases (A2 in FIG. 3) while an inertia torque is generated (C1 in FIG. 3).

Here, the value of a torque to be transmitted by the clutch 9 is obtained by subtracting the value of an inertia torque from the value of an engine torque. When the value of the engine torque is positive, the value of the inertia torque is negative. Therefore, the torque to be transmitted by the clutch 9 is temporarily increased by generating the inertia torque (D1 in FIG. 3). Thus, a large drive torque is transmitted to the wheels 3, such that the vehicle 1 is able to get out of the stuck state.

When the vehicle 1 gets out of the stuck state, the vehicle velocity increases (E1 in FIG. 3). Then, when a difference in rotational velocity between the input and output sides of the clutch 9 falls within a predetermined range, the controller 20 causes the clutch 9 to transition from the half-engaged state to the engaged state (B3 in FIG. 3).

It should be noted that when the transition speed of the clutch 9 to the engaged state is fast, a large inertia torque is generated. For example, during the second moving start control, the transition speed of the clutch 9 to the engaged state is faster than that of the clutch 9 to the disengaged state. In other words, as shown in FIG. 3, transition of the clutch 9 to the engaged state (B2 in FIG. 3) is executed in a shorter period of time than that of the clutch 9 to the disengaged state (B1 in FIG. 3). Thus, a large inertia torque is generated by rapidly switching the clutch 9 into the engaged state.

Figure 4:
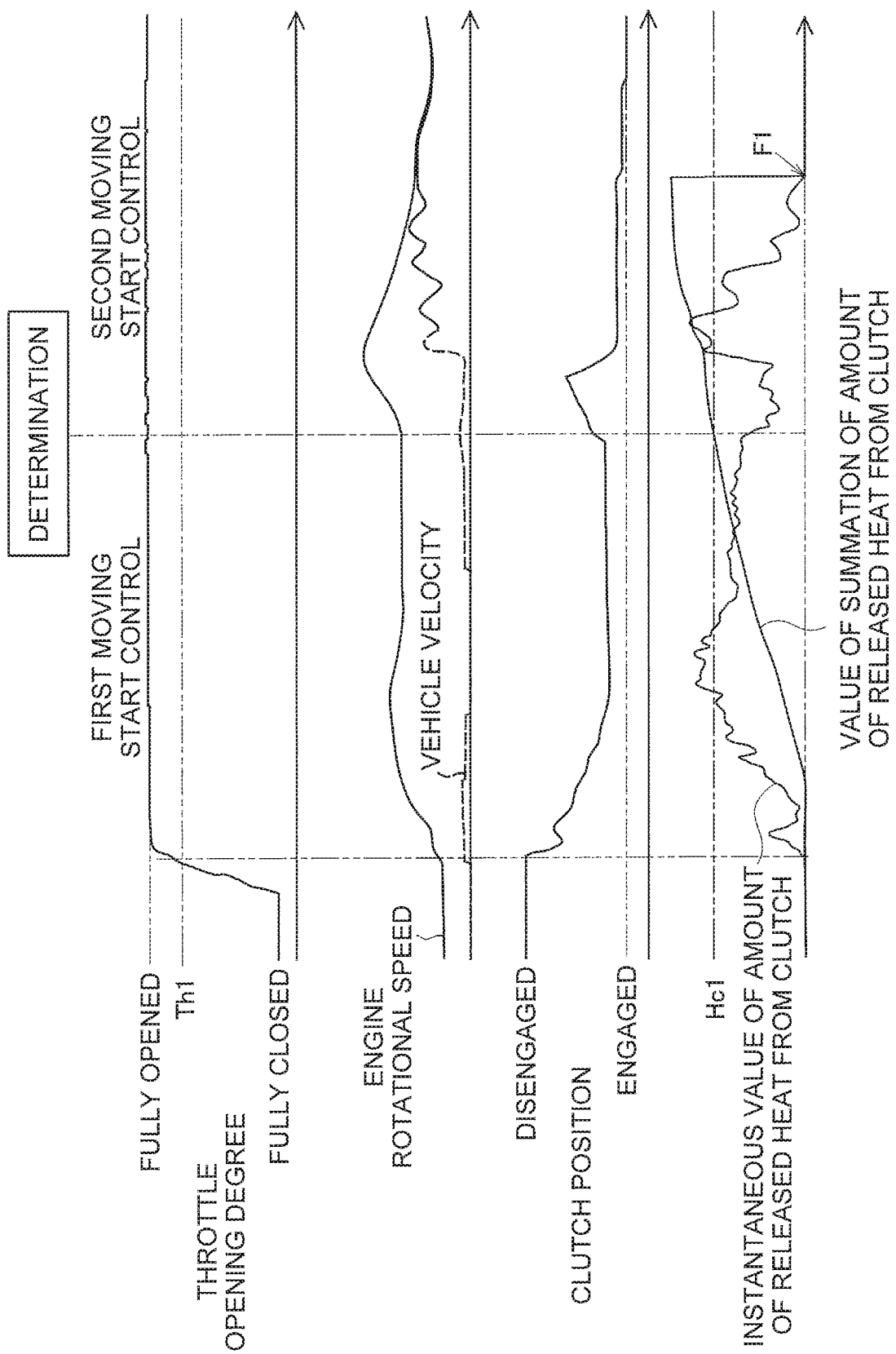
FIG. 4 is a timing chart showing variations in throttle opening degree and variations in amount of heat released from a clutch during the moving start control.

The first condition includes requirements that the amount of heat released from the clutch 9 is greater than or equal to a predetermined heat released threshold and that the throttle opening degree is greater than or equal to a predetermined throttle threshold. FIG. 4 is a timing chart showing variations in the throttle opening degree and variations in the amount of heat released from the clutch 9 during the first moving start control and the second moving start control.

The controller 20 is configured or programmed to calculate an instantaneous value of the amount of heat released from the clutch 9 based on the torque to be transmitted by the clutch 9 and a difference in the rotational velocity in the clutch 9. Specifically, the controller 20 calculates a value obtained by multiplying the value of the torque to be transmitted by the clutch 9, the value of the difference in the rotational velocity in the clutch 9, and a predetermined coefficient as the instantaneous value of the amount of heat released from the clutch 9.

The controller 20 also calculates a value of the summation of the amount of heat released from the clutch 9 by repeatedly calculating instantaneous values of the amount of heat released from the clutch 9 and summing the calculated instantaneous values from the onset of the first moving start control. Then, the controller 20 determines that the first condition is satisfied when the value of the summation of the amount of heat released from the clutch 9 is greater than or equal to a predetermined heat released threshold Hc1 and simultaneously when the throttle opening degree is greater than or equal to a predetermined throttle threshold Th1. It should be noted that the heat released threshold Hc1 may be changed in accordance with the throttle opening degree. For example, the heat released threshold Hc1 may be set to be greater with an increase in throttle opening degree. For example, the heat released threshold Hc1 is preferably set to be at or near a value at which thermal damage or breakage of the clutch 9 is prevented. The throttle threshold Th1 is preferably set to be at or near a value based on which the driver is regarded as operating the accelerator operator 44 so as to get out of the stuck state.

Figure 5:
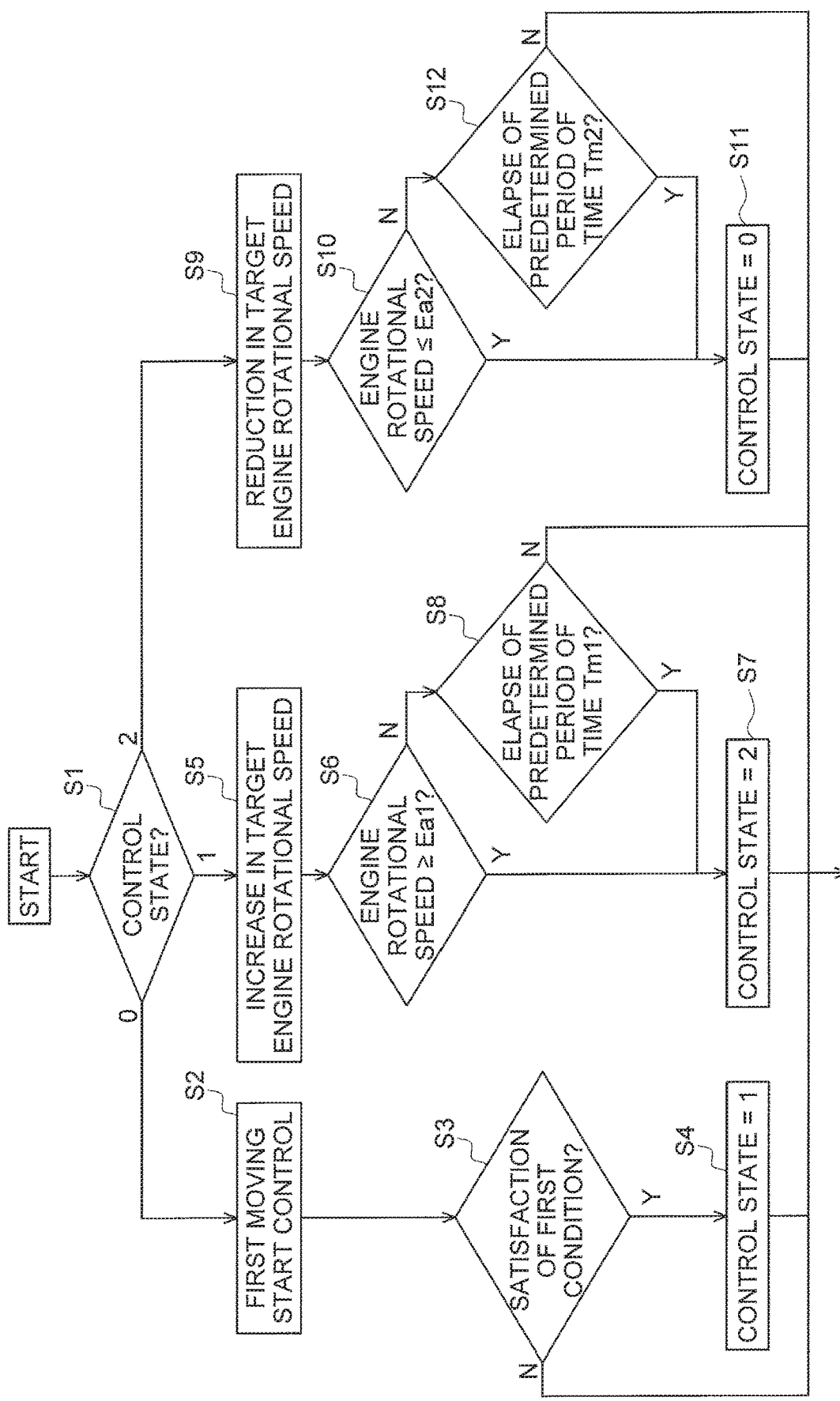
FIG. 5 is a flowchart showing a process regarding the moving start control.

FIG. 5 is a flowchart showing a process regarding the second moving start control. In step S1, the controller 20 determines a present control state. When the first condition is not satisfied, a value of "0" is assigned to the control state. When the value assigned to the control state is "0" in step S1, the process proceeds to step S2. In step S2, the controller 20 executes the first moving start control.

In step S3, the controller 20 determines whether or not the first condition is satisfied. When the first condition is satisfied, the process proceeds to step S4. In step S4, the controller 20 changes the value assigned to the control state to "1". When the first condition is not satisfied in step S3, the value assigned to the control state is kept as "0".

When the value assigned to the control state is "1" in step S1, the process proceeds to step S5. In step S5, the target engine rotational speed is increased. FIG. 6 is a timing chart showing variations in the target engine rotational speed and variations in the actual engine rotational speed during the first moving start control and the second moving start control.

As shown in FIG. 6, in the first moving start control, the target engine rotational speed is set to a target value Et1 in accordance with the throttle opening degree. The throttle opening degree is determined in accordance with the accelerator operating amount. Therefore, the target value Et1 is determined in accordance with the accelerator operating amount. The controller 20 controls the pressing force in the clutch 9 such that the actual engine rotational speed converges to the target value Et1.

When the first condition is satisfied, the controller 20 increases the target engine rotational speed from the target value Et1 to a target value Et2 in step S5. Accordingly, the clutch 9 is caused to transition to the disengaged state. As a result, the actual engine rotational speed increases. It should be noted that the target value Et2 may be a fixed value. Alternatively, the target value Et2 may be a value obtained by adding a predetermined fixed value to the target value Et1. Yet alternatively, the target value Et2 may be a value determined in accordance with the throttle opening degree, the present engine rotational speed or so forth.

As shown in FIG. 5, in step S6, the controller 20 determines whether or not the actual engine rotational speed is greater than or equal to a threshold Ea1. The threshold Ea1 is greater than the actual engine rotational speed at the onset of the second moving start control. The threshold Ea1 may be determined in accordance with the throttle opening degree or the actual engine rotational speed at the onset of the second moving start control. When the engine rotational speed is greater than or equal to the threshold Ea1, the process proceeds to step S7.

In step S7, the controller 20 changes the value assigned to the control state into "2". When the engine rotational speed is not greater than or equal to the threshold Ea1 in step S6, the process proceeds to step S8. In step S8, the controller 20 determines whether or not a predetermined period of time Tm1 has elapsed since the onset of the second moving start control. When the predetermined period of time Tm1 has elapsed since the onset of the second moving start control, the controller 20 changes the value assigned to the control state to "2" in step S7. When the predetermined period of time Tm1 has not elapsed since the onset of the second moving start control in step S8, the value assigned to the control state is kept as "1".

When the value assigned to the control state is "2" in step S1, the process proceeds to step S9. In step S9, the controller 20 reduces the target engine rotational speed. As shown in FIG. 6, the controller 20 reduces the target engine rotational speed from the target value Et2 to a target value Et3. Accordingly, the clutch 9 is caused to transition to the engaged state. It should be noted that the target value Et3 may be a fixed value. Alternatively, the target value Et3 may be determined based on the target value Et1 or the target value Et2. The target value Et2 may be smaller than the target value Et1.

As shown in FIG. 5, in step S10, the controller 20 determines whether or not the actual engine rotational speed is less than or equal to a threshold Ea2. The threshold Ea2 may be determined based on the threshold Ea1. Alternatively, the threshold Ea2 may be determined based on the actual engine rotational speed at the onset of the second moving start control. When the engine rotational speed is less than or equal to the threshold Ea2, the process proceeds to step S11.

In step S11, the controller 20 changes the value assigned to the control state to "0". In other words, the controller 20 finishes the second moving start control and executes again the first moving start control.

When the engine rotational speed is greater than the threshold Ea2 in step S10, the process proceeds to step S12. In step S12, the controller 20 determines whether or not a predetermined period of time Tm2 has elapsed since the point of time that the target engine rotational speed is reduced from the target value Et2 to the target value Et3. The predetermined period of time Tm2 may be equal to or different from the predetermined period of time Tm1. When the predetermined period of time Tm2 has elapsed, the controller 20 changes the value assigned to the control state to "0" in step S11. In other words, the controller 20 finishes the second moving start control. When the predetermined period of time Tm2 has not elapsed in step S12, the value assigned to the control state is kept as "2".

Figure 7:
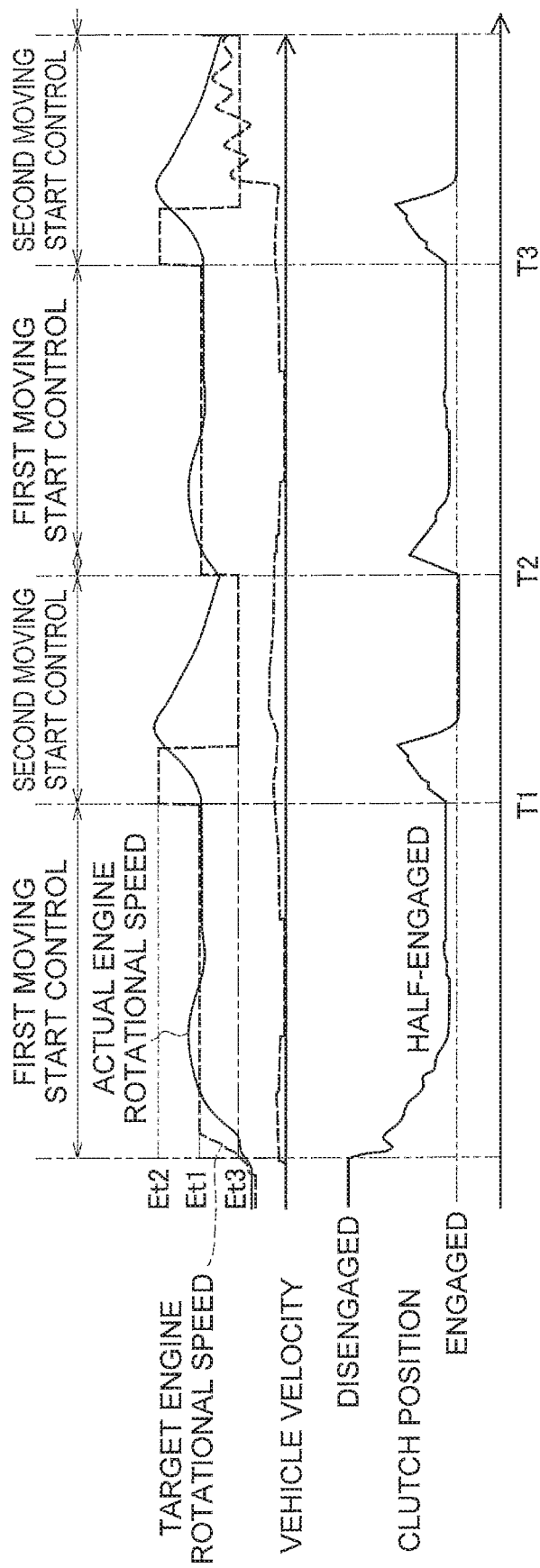
FIG. 7 is a timing chart in a condition that a first moving start control and a second moving start control are repeatedly executed.

Therefore, as shown in FIG. 7, the controller 20 starts the second moving start control so as to increase the target engine rotational speed to the target value Et2 (T1 in FIG. 7). Then, the controller 20 finishes the second moving start control and executes again the first moving start control when either of the following requirements is satisfied after the engine rotational speed is reduced from the target value Et2 to the target value Et3: the engine rotational speed reduces to the threshold Ea2 or less; and the predetermined period of time Tm2 has elapsed (T2 in FIG. 7). Then, when the first condition is satisfied, the controller 20 starts again the second moving start control (T3 in FIG. 7).

In other words, when a third condition is satisfied even while executing the second moving start control, the controller 20 temporarily stops executing the second moving start control. Thereafter, when the first condition is satisfied, the controller 20 executes again the second moving start control. In the present preferred embodiment, the third condition is satisfied when either of the following requirements is satisfied: the engine rotational speed is less than or equal to the threshold Ea2; and the half-engaged state has been continued for the predetermined period of time Tm2 or greater since the target engine rotational speed was reduced to the target value Et3. It should be noted that the third condition may be the following requirement instead of the above requirements or may include the following requirement instead of one of the above requirements: the vehicle velocity is less than or equal to a predetermined vehicle velocity threshold. Alternatively, the third condition may further include the requirement that the vehicle velocity is less than or equal to a predetermined vehicle velocity threshold, in addition to the above requirements.

With the above-described process, even when the vehicle 1 cannot get out of the stuck state by the first-time second moving start control, the chances are increased that the vehicle 1 gets out of the stuck state by temporarily executing again the first moving start control, and then, executing again the second moving start control. It should be noted that the above value of summation of the amount of heat released from the clutch 9 is reset whenever the second moving start control is finished (F1 in FIG. 4).

It should be noted that the controller 20 may cancel the moving start control when the half-engaged state has not been finished even after the second moving start control was executed a predetermined number of times. In canceling the moving start control, the controller 20 may execute at least one of the actions of causing the clutch 9 to transition to the disengaged state or the engaged state, outputting an alert display or alert sound, and reducing the output torque of the prime mover 4.

Preferred embodiments of the present invention have been explained above. However, the present invention is not limited to the above preferred embodiments, and a variety of changes can be made without departing from the scope of the present invention.

The vehicle 1 is not limited to an ROV, and may be another type of vehicle such as an ATV (All Terrain Vehicle). The configuration of the vehicle 1 may not be limited to that described above, and may be changed. For example, a rear seat(s) may be disposed rearward of the right and left seats 5R and 5L. The prime mover 4 may be another type of device such as an electric motor. In this case, the engine rotational speed may be an output rotational speed of the prime mover 4. The engine torque may be the output torque of the prime mover 4. A target output rotational speed of the prime mover 4 may be determined in accordance with the accelerator operating amount.

In the above preferred embodiments, the controller 20 preferably increases the engine rotational speed by increasing the target engine rotational speed and causing the clutch 9 to transition to the disengaged state during the second moving start control. However, the controller 20 may increase the engine rotational speed by increasing the throttle opening degree in the second moving start control.

Figure 8:
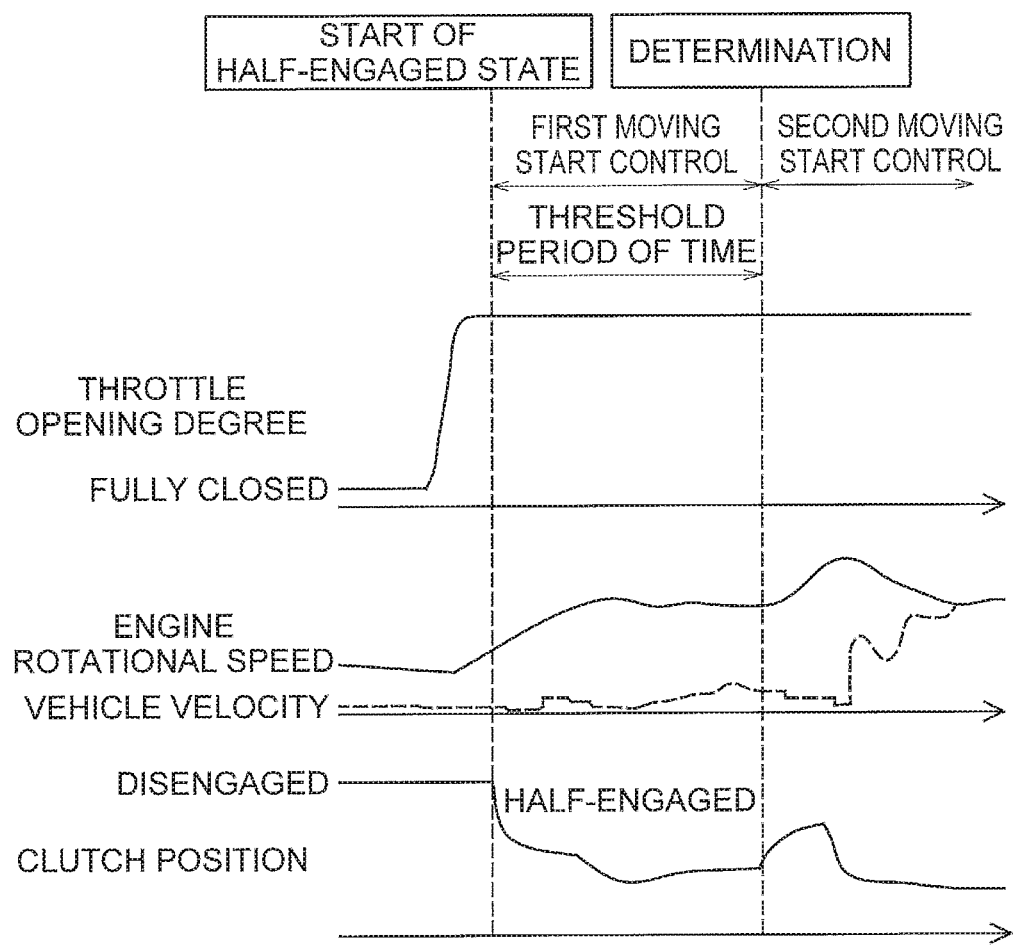
FIG. 8 is a timing chart of a moving start control according to a first modification of a preferred embodiment of the present invention.

Requirements defining the first condition are not limited to those described above, and may be changed. For example, as shown in FIG. 8, the controller 20 may determine that the first condition is satisfied when the following requirement is satisfied: duration of the half-engaged state of the clutch 9 is greater than or equal to a predetermined threshold period of time.

In this case, the threshold period of time may be determined in accordance with the throttle opening degree. For example, the threshold period of time may become smaller with an increase in the throttle opening degree. Alternatively, a count coefficient of the duration may be determined in accordance with the throttle opening degree. For example, the count coefficient may be determined such that counting the duration becomes quicker with an increase in throttle opening degree.

Figure 9:
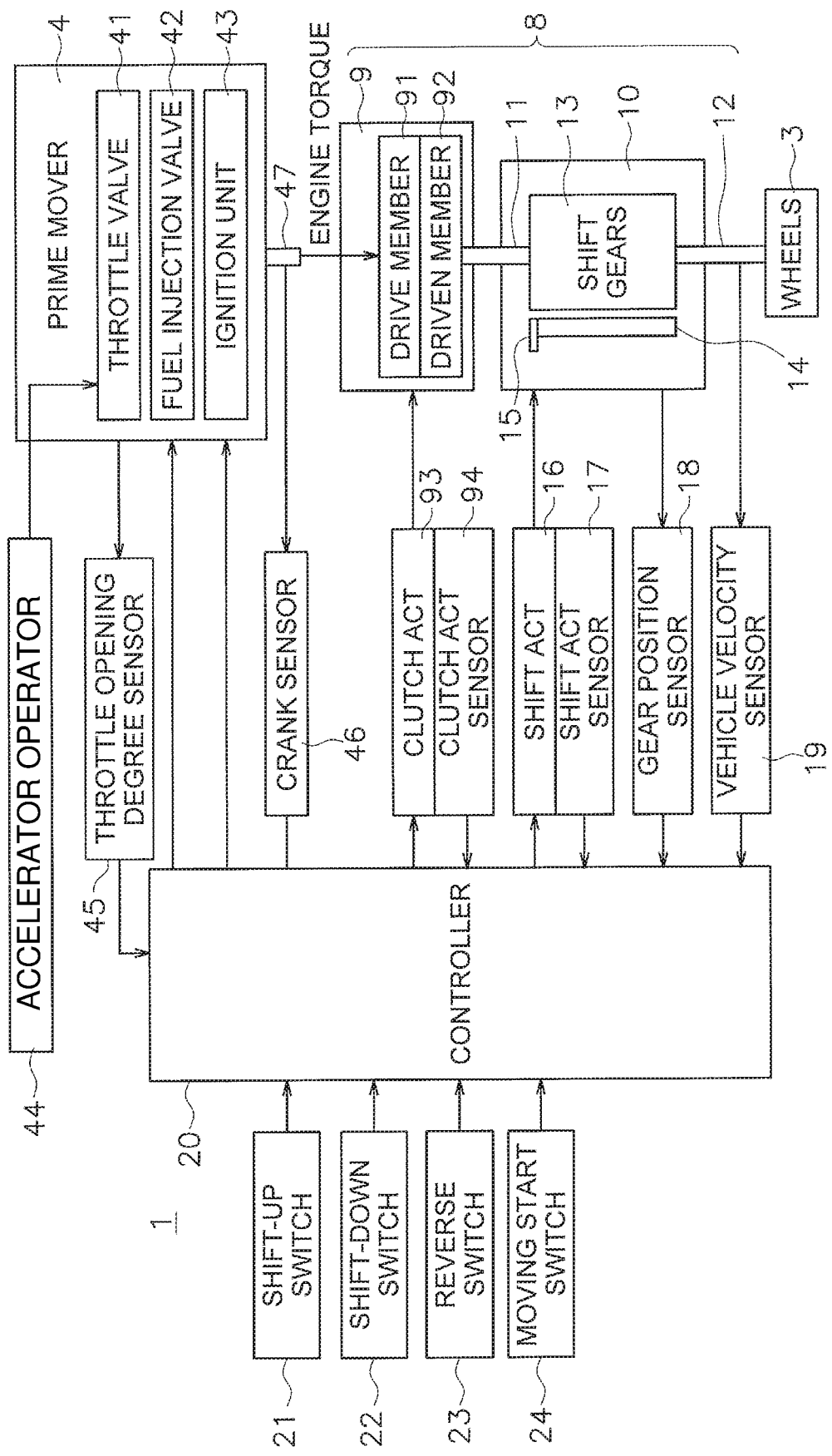
FIG. 9 is a block diagram of a drive train and a control system of a vehicle according to a second modification of a preferred embodiment of the present invention.

Alternatively, as shown in FIG. 9, a moving start switch 24 may be provided. The moving start switch 24 is preferably disposed forward of or in the surroundings of the seat 5L, 5R of the driver. The controller 20 may determine that the first condition is satisfied when receiving a command signal from the moving start switch 24. Alternatively, the controller 20 may determine that the first condition is satisfied when receiving the command signal from the moving start switch 24 and when the other requirement is satisfied. The moving start switch 24 may be a switch exclusively to execute the second moving start control. Alternatively, the moving start switch 24 may be used not only as a switch to execute the second moving start control but also as a switch to execute other functions.

Alternatively, the first condition may be the combination of two or more of the following requirements: the duration of the half-engaged state of the clutch 9 is greater than or equal to the predetermined threshold period of time; the amount of heat released from the clutch 9 is greater than or equal to the predetermined heat released threshold; and the start command is received from the switch.

The first condition may further include at least one of the following requirements: the throttle opening degree is greater than or equal to the predetermined throttle threshold; the vehicle velocity is less than or equal to the predetermined vehicle velocity threshold; and the acceleration of the vehicle 1 is less than or equal to a predetermined acceleration threshold. For example, the controller 20 may determine that the first condition is satisfied when the vehicle velocity is less than or equal to the predetermined vehicle velocity threshold and when the duration of the half-engaged state of the clutch 9 is greater than or equal to the predetermined threshold period of time. The vehicle velocity threshold is preferably at or near a value based on which whether or not the vehicle 1 is in the stuck state is determined.

Figure 10:
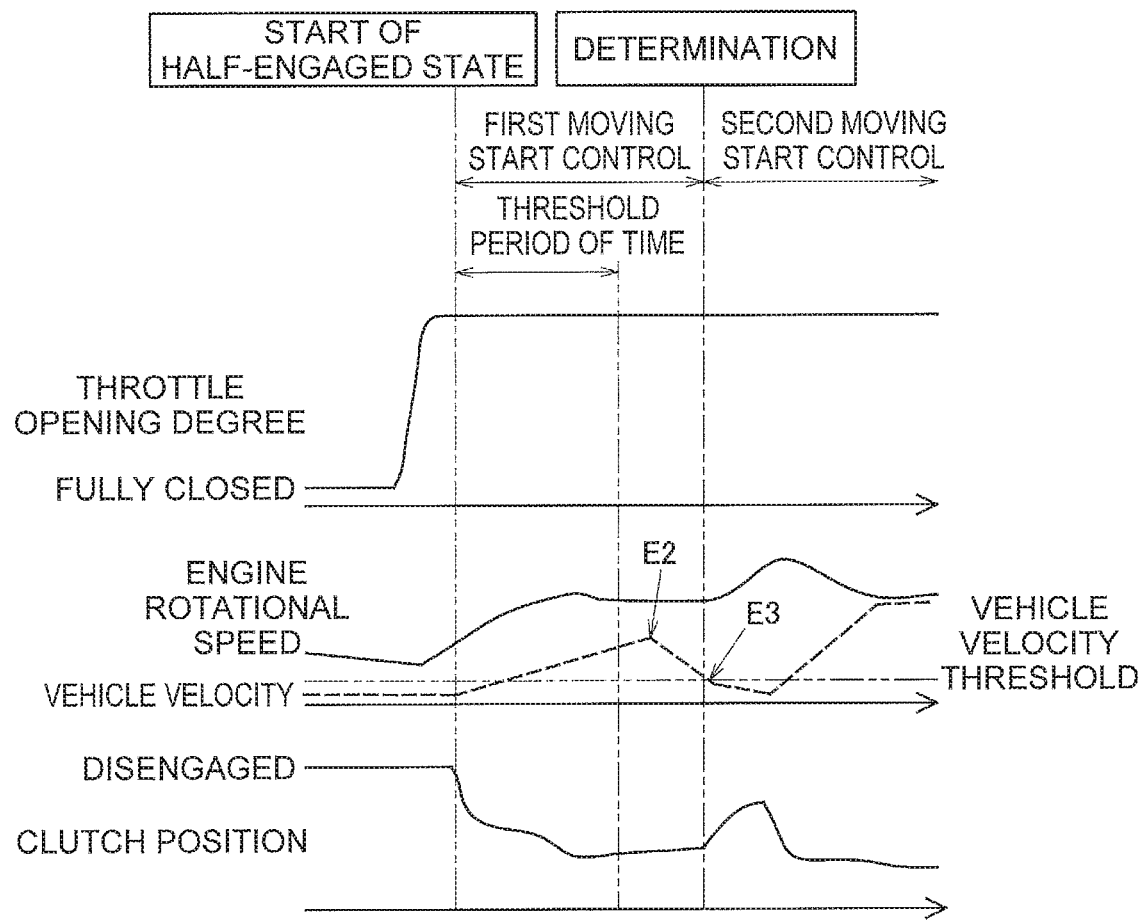
FIG. 10 is a timing chart of a moving start control according to a third modification of a preferred embodiment of the present invention.

In this case, as shown in FIG. 10, even if the duration of the half-engaged state of the clutch 9 is greater than or equal to the predetermined threshold period of time, the second moving start control is not executed when the vehicle velocity is greater than the vehicle velocity threshold (E2 in FIG. 10). In other words, the second moving start control is not executed when the vehicle velocity is large enough to regard the vehicle 1 as not being in the stuck state. Then, the second moving start control is executed when the duration of the half-engaged state of the clutch 9 is greater than or equal to the predetermined threshold period of time and when the vehicle velocity is less than or equal to the vehicle velocity threshold (E3 in FIG. 10). In other words, the second moving start control is executed when the vehicle velocity is small enough to regard the vehicle 1 as being in the stuck state.

Alternatively, the controller 20 may determine that the first condition is satisfied when the acceleration of the vehicle 1 is less than or equal to the predetermined acceleration threshold and when the duration of the half-engaged state of the clutch 9 is greater than or equal to the predetermined threshold period of time. The acceleration threshold is preferably at or near a value of acceleration at which the vehicle 1 is able to get out of the stuck state.

Figure 11:
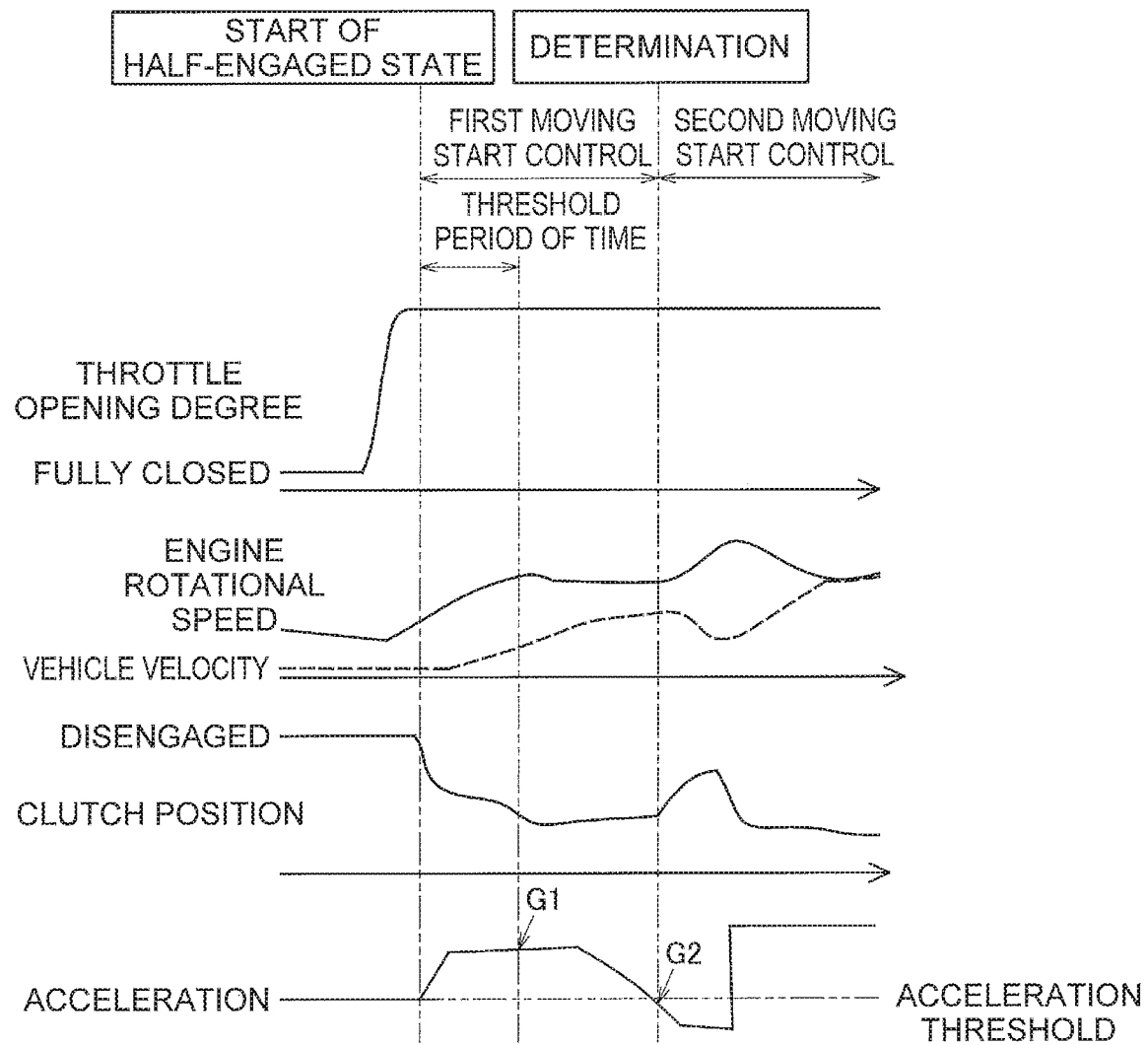
FIG. 11 is a timing chart of a moving start control according to a fourth modification of a preferred embodiment of the present invention.

In this case, as shown in FIG. 11, the second moving start control is not executed when the acceleration of the vehicle 1 is greater than the acceleration threshold even if the duration of the half-engaged state of the clutch 9 is greater than or equal to a predetermined threshold period of time (G1 in FIG. 11). In other words, the second moving start control is not executed when the acceleration of the vehicle 1 is at or near a magnitude at which the vehicle 1 is able to get out of the stuck state (G1 in FIG. 11). Then, the second moving start control is executed when the duration of the half-engaged state of the clutch 9 is greater than or equal to the predetermined threshold period of time and the acceleration of the vehicle 1 is less than or equal to the acceleration threshold (G2 in FIG. 11). In other words, the second moving start control is executed when the acceleration of the vehicle 1 is not near a magnitude at which the vehicle 1 is able to get out of the stuck state.

In the second moving start control, the speed at which the clutch 9 is caused to transition to the engaged state or the pressing force in the clutch 9 may be changed. In a timing chart shown in FIG. 12, solid lines indicate variations in the engine rotational speed, vehicle velocity, and the position of the clutch 9 in a condition that the transition speed of the clutch 9 is fast. In this timing chart, broken lines indicate variations in the engine rotational speed, vehicle velocity, and the position of the clutch 9 in a condition that the transition speed of the clutch 9 is slow.

Figure 12:
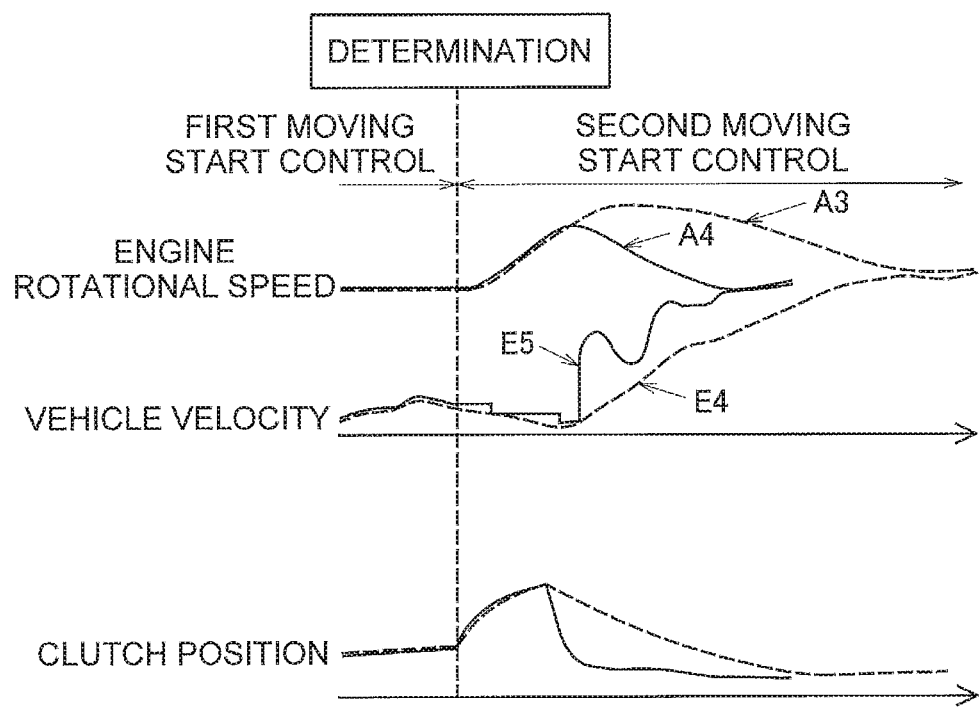
FIG. 12 is a timing chart of a moving start control according to a fifth modification of a preferred embodiment of the present invention.

As indicated by the broken line in FIG. 12, the engine rotational speed reduces with a gentle slope when the transition speed of the clutch 9 is slow (A3 in FIG. 12). Therefore, an inertia torque inevitably becomes small. However, the vehicle velocity increases at a gentle slope (E4 in FIG. 12), such that behavior of the vehicle 1 is stabilized.

On the other hand, as indicated with the solid line in FIG. 12, the vehicle velocity increases at a steep slope when the transition speed of the clutch 9 is fast (E5 in FIG. 12), such that behavior of the vehicle 1 inevitably becomes erratic. However, the engine rotational speed reduces at a steep slope (A4 in FIG. 12). Therefore, the inertia torque becomes large, such that the chances are increased that the vehicle 1 gets out of the stuck state.

For example, when the second moving start control is executed a plurality of times, the transition speed of the clutch 9 may be increased with an increase in the number of times of executing the second moving start control. Alternatively, the transition speed of the clutch 9 may be changed in accordance with the throttle opening degree. For example, the transition speed of the clutch 9 may be increased with an increase in the throttle opening degree.

In a condition that the pressing force in the clutch 9 is large, variations in the engine rotational speed and variations in vehicle velocity are similar to those in the condition that the transition speed of the clutch 9 is fast. In a condition that the pressing force in the clutch 9 is small, variations in the engine rotational speed and variations in the vehicle velocity are similar to those in the condition that the transition speed of the clutch 9 is slow. For example, the pressing force in the clutch 9 may be increased with an increase in the number of times of executing the second moving start control. Alternatively, the pressing force in the clutch 9 may be changed in accordance with the throttle opening degree. For example, the pressing force in the clutch 9 may be increased with an increase in the throttle opening degree.

Figure 13:
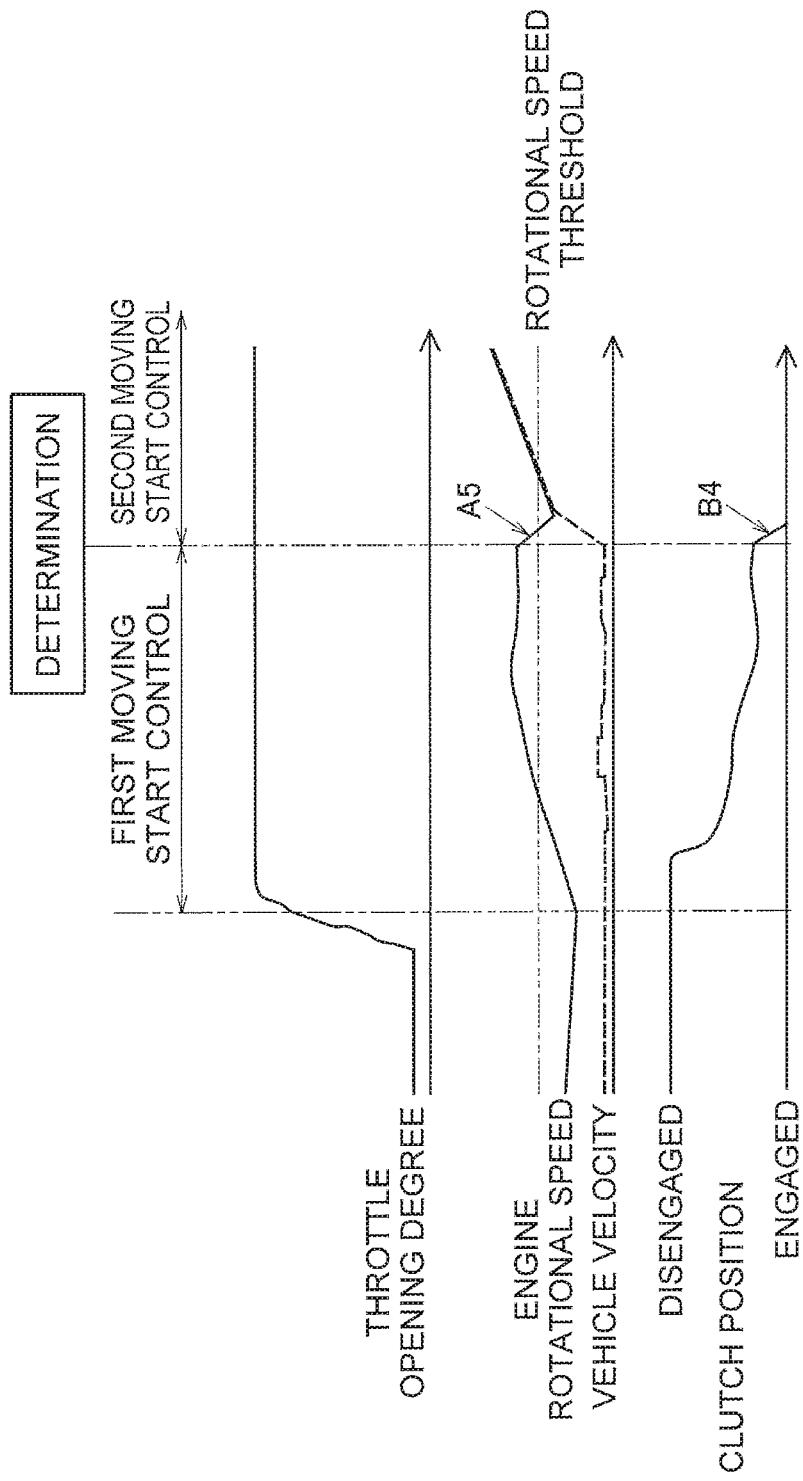
FIG. 13 is a timing chart of a moving start control according to a sixth modification of a preferred embodiment of the present invention.

When a second condition is satisfied at the onset of the second moving start control, the controller 20 may cause the clutch 9 to transition to the engaged state without increasing the engine rotational speed. The second condition herein includes a requirement that the engine rotational speed is greater than or equal to a predetermined rotational speed threshold. For example, as shown in FIG. 13, when the engine rotational speed is greater than or equal to the predetermined rotational speed threshold at the onset of the second moving start control, the clutch 9 is caused to transition to the engaged state (B4 in FIG. 13) without increasing the engine rotational speed (A5 in FIG. 13). Similarly in this case, the engine rotational speed is sufficiently large at the onset of the second moving start control, such that a large inertia torque is generated.

When the engine rotational speed is smaller than the rotational speed threshold at the onset of the second moving start control, similarly to the above preferred embodiments, the engine rotational speed is increased (A1 in FIG. 3), and thereafter, the clutch 9 is caused to transition to the engaged state (B2 in FIG. 3). Accordingly, when the engine rotational speed is not sufficiently large at the onset of the second moving start control, a large inertia torque is generated by temporarily increasing the engine rotational speed and thereafter causing the clutch 9 to transition to the engaged state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
 a prime mover;
 a pair of right and left wheels;
 a clutch disposed in a driving force transmission path between the prime mover and the pair of right and left wheels; and
 a controller configured or programmed to cause the clutch to transition from a half-engaged state to an engaged state when a difference in rotational velocity between input and output sides of the clutch falls within a predetermined range in the half-engaged state of the clutch; wherein
 the controller executes a moving start control when a first condition is satisfied in the half-engaged state of the clutch;
 the controller is configured or programmed to, during the moving start control, cause the clutch to transition toward a disengaged state to increase an output rotational velocity of the prime mover, and cause the clutch to transition to the engaged state when the output rotational velocity is increased;
 the first condition includes a requirement that an amount of heat released from the clutch is greater than or equal to a predetermined heat released threshold; and
 a transition speed of the clutch toward the engaged state is larger than a transition speed of the clutch toward the disengaged state during the moving start control.

2. The vehicle according to claim 1, wherein the first condition includes at least one requirement that a duration of the half-engaged state of the clutch is greater than or equal to a predetermined threshold period of time, and that a start command is received from a switch.

3. The vehicle according to claim 1, wherein
 the controller is configured or programmed to calculate the amount of heat released based on a torque to be transmitted by the clutch and/or the difference in rotational velocity in the clutch.

4. The vehicle according to claim 1, wherein
 the prime mover includes an internal combustion engine; and
 the first condition further includes at least one requirement that a throttle opening degree of the prime mover is greater than or equal to a predetermined throttle threshold, that a vehicle velocity is less than or equal to a predetermined vehicle velocity threshold, and that an acceleration of the vehicle is less than or equal to a predetermined acceleration threshold.

5. The vehicle according to claim 1, wherein when a second condition is satisfied, the controller is configured or programmed to cause the clutch to transition to the engaged state without increasing the output rotational velocity of the prime mover, the second condition including a requirement that the output rotational velocity of the prime mover is greater than or equal to a predetermined rotational velocity threshold.

6. The vehicle according to claim 1, wherein
the prime mover includes an internal combustion engine; and
the controller is configured or programmed to increase the output rotational velocity of the prime mover by increasing a throttle opening degree of the prime mover.

7. The vehicle according to claim 1, wherein the transition speed of the clutch toward the engaged state is able to be changed.

8. The vehicle according to claim 1, wherein when a third condition is satisfied, and when the difference in the rotational velocity between the input and output sides of the clutch does not fall in the predetermined range even by executing the moving start but the third condition is satisfied, the controller executes again the moving start control, the third condition including a requirement that the half-engaged state has not been completed.

9. The vehicle according to claim 8, wherein the controller is configured or programmed to cancel the moving start control when the half-engaged state has not been completed even by executing the moving start control a predetermined number of times.

10. The vehicle according to claim 9, wherein, when the controller cancels the moving start control, the controller is configured or programmed to execute at least one action of causing the clutch to transition to the disengaged state or the engaged state, outputting an alert display or an alert sound, and reducing an output torque of the prime mover.

11. The vehicle according to claim 1, further comprising seats disposed in side-by-side arrangement.

12. The vehicle according to claim 1, further comprising a seat, wherein the prime mover is disposed rearward of the seat.

13. The vehicle according to claim 1, further comprising a seat and a steering wheel disposed forward of the seat.

14. The vehicle according to claim 1, further comprising a seat and a roll cage disposed above the seat.

15. A vehicle comprising:
a prime mover;
a pair of right and left wheels;
a clutch disposed in a driving force transmission path between the prime mover and the pair of right and left wheels; and
a controller configured or programmed to cause the clutch to transition from a half-engaged state to an engaged state when a difference in rotational velocity between input and output sides of the clutch falls within a predetermined range in the half-engaged state of the clutch; wherein
the controller executes a moving start control to increase an output rotational velocity of the prime mover and cause the clutch to transition to the engaged state when a first condition is satisfied in the half-engaged state of the clutch;
the first condition includes at least one requirement that a duration of the half-engaged state of the clutch is greater than or equal to a predetermined threshold period of time, that an amount of heat released from the clutch is greater than or equal to a predetermined heat released threshold, and that a start command is received from a switch;
the prime mover includes an internal combustion engine; and the threshold period of time and/or the heat released threshold are changed in accordance with a throttle opening degree of the prime mover.

16. A vehicle comprising:
a prime mover;
a pair of right and left wheels;
a clutch disposed in a driving force transmission path between the prime mover and the pair of right and left wheels; and
a controller configured or programmed to cause the clutch to transition from a half-engaged state to an engaged state when a difference in rotational velocity between input and output sides of the clutch falls within a predetermined range in the half-engaged state of the clutch; wherein
the controller executes a moving start control to increase an output rotational velocity of the prime mover and cause the clutch to transition to the engaged state when a first condition is satisfied in the half-engaged state of the clutch;
a transition speed of the clutch is able to be changed;
the prime mover includes an internal combustion engine; and
the controller is configured or programmed to change the transition speed of the clutch in accordance with a throttle opening degree of the prime mover.

17. A vehicle comprising:
a prime mover;
a pair of right and left wheels;
a clutch disposed in a driving force transmission path between the prime mover and the pair of right and left wheels; and
a controller configured or programmed to cause the clutch to transition from a half-engaged state to an engaged state when a difference in rotational velocity between input and output sides of the clutch falls within a predetermined range in the half-engaged state of the clutch; wherein
the controller executes a moving start control to increase an output rotational velocity of the prime mover and cause the clutch to transition to the engaged state when a first condition is satisfied in the half-engaged state of the clutch;
when a third condition is satisfied, and when the difference in the rotational velocity between the input and output sides of the clutch does not fall in the predetermined range even by executing the moving start but the third condition is satisfied, the controller executes again the moving start control, the third condition including a requirement that the half-engaged state has not been completed; and
the third condition further includes at least one requirement that a duration of the half-engaged state is greater than or equal to a predetermined threshold period of time, that the output rotational velocity of the prime mover is less than or equal to a predetermined rotational velocity threshold, and that a vehicle velocity is less than or equal to a predetermined vehicle velocity threshold.

18. A method of controlling a clutch for a vehicle, the method comprising:
causing the clutch to transition from a half-engaged state to an engaged state when a difference in rotational velocity between input and output sides of the clutch falls within a predetermined range in the half-engaged state of the clutch; and executing a moving start control when a first condition is satisfied in the half-engaged state of the clutch; and during the moving start control, causing the clutch to transition toward a disengaged state to increase an output rotational velocity of the prime mover, and causing the clutch to transition to the engaged state when the output rotational velocity is increased; wherein the first condition includes a requirement that an amount of heat released from the clutch is greater than or equal to a predetermined heat released threshold; and a transition speed of the clutch toward the engaged state is larger than a transition speed of the clutch toward the disengaged state during the moving start control.

* * * * *